United States Patent
Durnov (10) Patent No.: US 10,664,272 B2
(45) Date of Patent: May 26, 2020

(54) CROSS-LEVEL PREFETCH FOR SHARED MULTI-LEVEL LIBRARIES

(71) Applicant: Intel Corporation, Santa Clara, CA (US)

(72) Inventor: Dmitry Igorevich Durnov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 15/553,519

(22) PCT Filed: Mar. 26, 2015

(86) PCT No.: PCT/RU2015/000180
§ 371 (c)(1),
(2) Date: Aug. 24, 2017

(87) PCT Pub. No.: WO2016/153378
PCT Pub. Date: Sep. 29, 2016

(65) Prior Publication Data
US 2018/0032339 A1 Feb. 1, 2018

(51) Int. Cl.
*G06F 3/00* (2006.01)
*G06F 9/30* (2018.01)
(Continued)

(52) U.S. Cl.
CPC ...... *G06F 9/30047* (2013.01); *G06F 9/44521* (2013.01); *G06F 9/50* (2013.01);
(Continued)

(58) Field of Classification Search
CPC ....................................................... G06F 9/541
(Continued)

(56) References Cited

U.S. PATENT DOCUMENTS 6,298,440 B1 * 10/2001 Siegel ................. G06F 9/44521
713/1
8,443,150 B1    5/2013 de la Iglesia
(Continued)

OTHER PUBLICATIONS

Chew Keong, Defeating Kernel Native API Hookers by direct service dispatch table restoration. (Year: 2004).*
(Continued)

*Primary Examiner* — Lechi Truong
(74) *Attorney, Agent, or Firm* — Schwabe, Williamson & Wyatt, P.C.

(57) ABSTRACT

In embodiments, apparatuses, methods and storage media (transitory and non-transitory) are described that are associated with receiving a call from an application at a shared library, accessing a first resource based at least in part on the first call, and storing a prefetch entry in a prefetch engine based at least in part on an address of a second resource in preparation to service a second call to the shared library that requires traversal of a plurality of stages at the shared library. A prefetch request may be performed based at least in part on the second call, and the second resource may be accessed based at least in part on a result of the prefetch request. In embodiments, the shared library may be a Message Passing Interface (MPI) library. Other embodiments may be described and/or claimed.

24 Claims, 4 Drawing Sheets

(51) Int. Cl.
  *G06F 9/445* (2018.01)
  *H04L 29/08* (2006.01)
  *G06F 12/0862* (2016.01)
  *G06F 9/54* (2006.01)
  *G06F 9/50* (2006.01)
  *G06F 13/14* (2006.01)

(52) U.S. Cl.
  CPC .......... *G06F 9/541* (2013.01); *G06F 12/0862* (2013.01); *G06F 13/14* (2013.01); *H04L 67/10* (2013.01); *G06F 2212/1024* (2013.01); *G06F 2212/154* (2013.01)

(58) Field of Classification Search
  USPC ......................................................... 719/328
  See application file for complete search history.

(56) References Cited

U.S. PATENT DOCUMENTS

| | | | | |
|---|---|---|---|---|
| 8,996,821 | B1* | 3/2015 | McClure | ................ G06F 9/545 711/147 |
| 2003/0069902 | A1* | 4/2003 | Narang | ............... G06F 16/2477 |
| 2009/0313636 | A1 | 12/2009 | Barsness et al. | |
| 2010/0268892 | A1 | 10/2010 | Luttrell | |
| 2010/0333074 | A1 | 12/2010 | Supalov et al. | |
| 2011/0225342 | A1* | 9/2011 | Sharma | ................... G06F 12/08 711/6 |
| 2012/0072667 | A1 | 3/2012 | Anderson et al. | |
| 2012/0185873 | A1* | 7/2012 | Archer | ............. G06F 15/17318 719/313 |
| 2013/0326536 | A1* | 12/2013 | Connor | ............... G06F 11/0715 718/106 |
| 2016/0179546 | A1* | 6/2016 | Yamada | ................. G06F 21/54 712/240 |
| 2017/0032118 | A1* | 2/2017 | Carson | .................... G06F 21/52 |

OTHER PUBLICATIONS

Extended European Search Report dated Oct. 22, 2018 for European Patent Application No. 15886609.5, 7 pages.

International Search Report and Written Opinion dated Feb. 11, 2016 for International Application No. PCT/RU2015/000180, 6 pages.

* cited by examiner

CROSS-LEVEL PREFETCH FOR SHARED MULTI-LEVEL LIBRARIES

CROSS REFERENCE TO RELATED APPLICATIONS

The present application is a national phase entry under 35 U.S.C. § 371 of International Application No. PCT/RU2015/000180, filed Mar. 26, 2015, entitled "CROSS-LEVEL PREFETCH FOR SHARED MULTILEVEL LIBRARIES", which designated, among the various States, the United States of America. The specification of the PCT/RU2015/000180 Application is hereby fully incorporated by reference.

TECHNICAL FIELD

The present disclosure relates to the field of data processing, in particular, to prefetching data resources into a cache.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Moving from one level to another of a shared library using a multi-level software stack, such as the Message Passing Interface (MPI) library, may cost CPU cycles, especially when required data is not in the CPU's cache. This may be particularly the case for small message transfer path performance which is sensitive to memory access latency. Existing schemes for prefetching typically operate on one particular level of a multi-level library by prefetching a far part of data while working on a closer part of the data from the same level. This technique does not function optimally for small messages.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Figure 1:
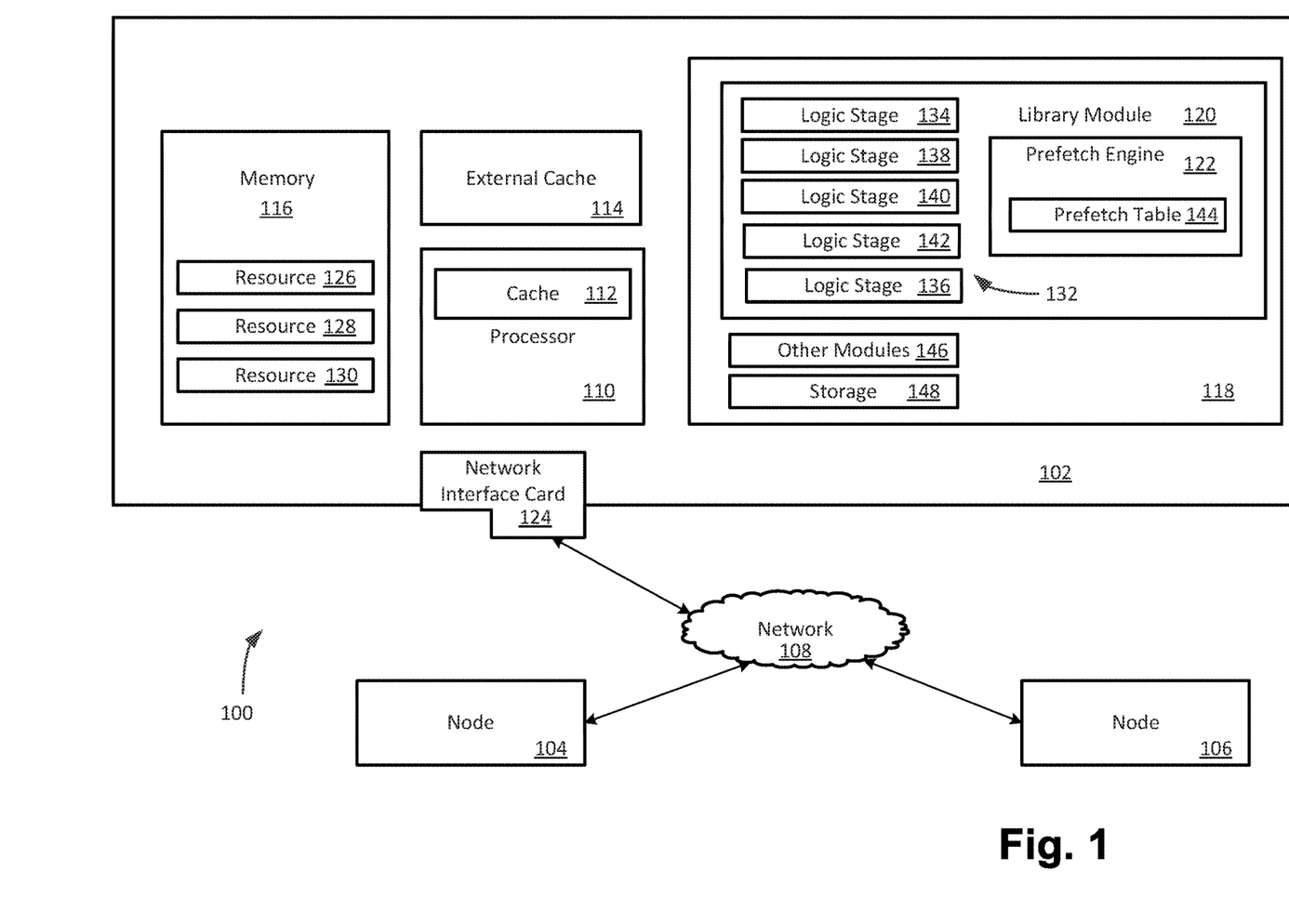
FIG. 1 is a block diagram of a network environment including a computing device having a shared multi-level library and prefetch teaching of the present disclosure, in accordance with various embodiments.

Referring now to FIG. 1, a network environment 100, including a computing device 102 having a shared multi-level library and prefetch teaching of the present disclosure, in accordance with various embodiments, is illustrated. The computing device 102 may be in data communication with computing nodes 104, 106 over a network 108. As shown, computing device 102 may include a number of components 110-148, including a processor 110, an integrated cache 112, an external cache 114, a system memory 116, an execution environment 118, a library module 120, a prefetch engine 122, and a network interface card (NIC) 124 that may be coupled together and configured to cooperate with each other to prefetch resources from the system memory 116 or another location to a cache such as the integrated cache 112 or the external cache 114 using the prefetch engine 122. In embodiments, the processor 110 may include multiple processors or processor cores. In embodiments, the integrated cache 112 or the external cache 114 may have more than one cache level. For example, the integrated cache 112 may have a Level 1 (L1) cache and a Level 2 (L2) cache in various embodiments.

The system memory 116 may include a plurality of resources, such as a first resource 126, a second resource 128, and a third resource 130 that may be non-transitory, or transitory such as during execution of an application program by the processor 110, for example. In embodiments, the execution environment 118 may include the library module 120 which may be a shared library module in various embodiments. In embodiments, the library module 120 may include a software stack 132 that includes a plurality of layers or logic stages. The library module 120 may be a Message Passing Interface (MPI) library in various embodiments.

In embodiments, the software stack 132 may include a first logic stage 134, a second logic stage 136, a third logic stage 138, a fourth logic stage 140, and a fifth logic stage 142. The first logic stage 134 may be an entry level of an MPI library and the second logic stage 136 may be a transport level such as an MPI library level with access to hardware resources or resources stored in memory, in embodiments. The third logic stage 138, fourth logic stage 140, and fifth logic stage 142 may be layers of the software stack, in stack order, that are between the first logic stage 134 and the second logic stage 136. In embodiments, the software stack 132 may include levels of an MPI library corresponding to an MPI standard, such as MPI standard Version 2.0 (MPI-2), or 3.0 (MPI-3), for example. Levels of the software stack 132 may include an abstract device interface, such as a third generation of the abstract device interface (ADI3), a channel interface, such as the third version of the channel interface (CH3), and a communications layer, such as Nemesis (which may function as a low-level communication subsystem layer and act as a CH3 channel in some MPI implementations), in various embodiments. ADI3 may be a layer that uses the CH3 to implement communication channels that provide routines to send data between MPI processes and provide other capabilities in various embodiments. In embodiments, each level or interface of the software stack 132 may correspond to one or more of the first logic stage 134, the second logic stage 136, the third logic stage 138, the fourth logic stage 140, the fifth logic stage 142, or other logic stages if present in the software stack 132. In embodiments, the software stack may have a different number of logic stages.

In embodiments, a lower level of the software stack 132, such as the second logic stage 136, for example, may provide access to intra-node resources, such as a shared memory resource. Access to the shared memory resource may be by using CH3 or Nemesis, for example. In embodiments, the shared memory resource may correspond to the first resource 126, the second resource 128, and the third resource 130. The shared memory resources may be structured in different manners, depending on the application, such as a buffer, array, or linked list, for example, in various embodiments. In embodiments, a lower level of the software stack 132, such as the second logic stage, may provide access to inter-node resources, such as by using a network communications fabric through Nemesis or another communications layer. Internode resources may be accessed using interfaces or drivers provided by a technology such as InfiniBand, iWarp, Dolphin, Qlogic, Intel® True Scale, Myrinet, or Ethernet, for example. In embodiments, intermediate stages such as Direct Access Programming Library (DAPL), OpenFabrics alliance (OFA) interfaces, OpenFabrics Enterprise Distribution (OFED™) verbs, Remote Direct Memory Access (RDMA), Tag Matching Interface (TMI), sockets, or other technologies may be used in accessing the inter-node resources or intra-node resources. In embodiments, the computing device 102 may access inter-node resources such as registered memory on the node 104 or the node 106 over the network 108 by communicating over the NIC 124, for example.

In embodiments, the prefetch engine 122 may include a prefetch table 144 that may include a parameter corresponding to a resource to be prefetched. In embodiments, the prefetch table 144 may include a pointer to an address of a resource, a prefetch type, and a prefetch depth. In embodiments, the prefetch type may include a parameter that may correspond to a cache level, such as L1, L2, or Level 3 (L3) for example, to which the resource is to be prefetched or requested to be prefetched. In embodiments, the prefetch depth may include a parameter that corresponds to a number of cache lines to be prefetched. In embodiments, the cache line size may be 64 bytes. The prefetch table 144 may include only a parameter corresponding to a resource to be prefetched in embodiments, and the prefetch engine 122 may include a predefined prefetch type or a predefined prefetch depth in various embodiments, or may use a default prefetch type or default prefetch depth when not specified in the prefetch table 144. For example, the predefined prefetch type may be prefetch to L1 cache and the predefined prefetch depth may be two cache lines, in an embodiment. Generally, in embodiments, the prefetch table may include entries such as the following:

prefetch_engine[(prefetch_entry_index)]=(address);
prefetch_engine_control[(prefetch_entry_index)].type= (type_); and
prefetch_engine_control[(prefetch_enty_index)].depth= (depth_).

In embodiments, the prefetch type may be MM_HINT_T0, MM_HINT_T1, or MM_HINT_T2, for example. The prefetch type may also specify prefetching into more than one level of cache in various embodiments.

The execution environment 118 may also include other modules 146 and/or storage 148 in various embodiments. The execution environment 118 may also include an operating system (OS) operated by the processor 110. In embodiments, the execution environment may include an application, such as an MPI application that when executed by the processor 110 cause one or more processes to call the library module 120. In embodiments, each process may have its own prefetch engine such that multiple instances of the prefetch engine 122 may be present while the processes are being executed by the processor 110. In embodiments, the application may be included in other modules 146. The node 104 or the node 106 may be structured in a similar manner or include similar components to the computing device 102 in various embodiments.

Figure 2:
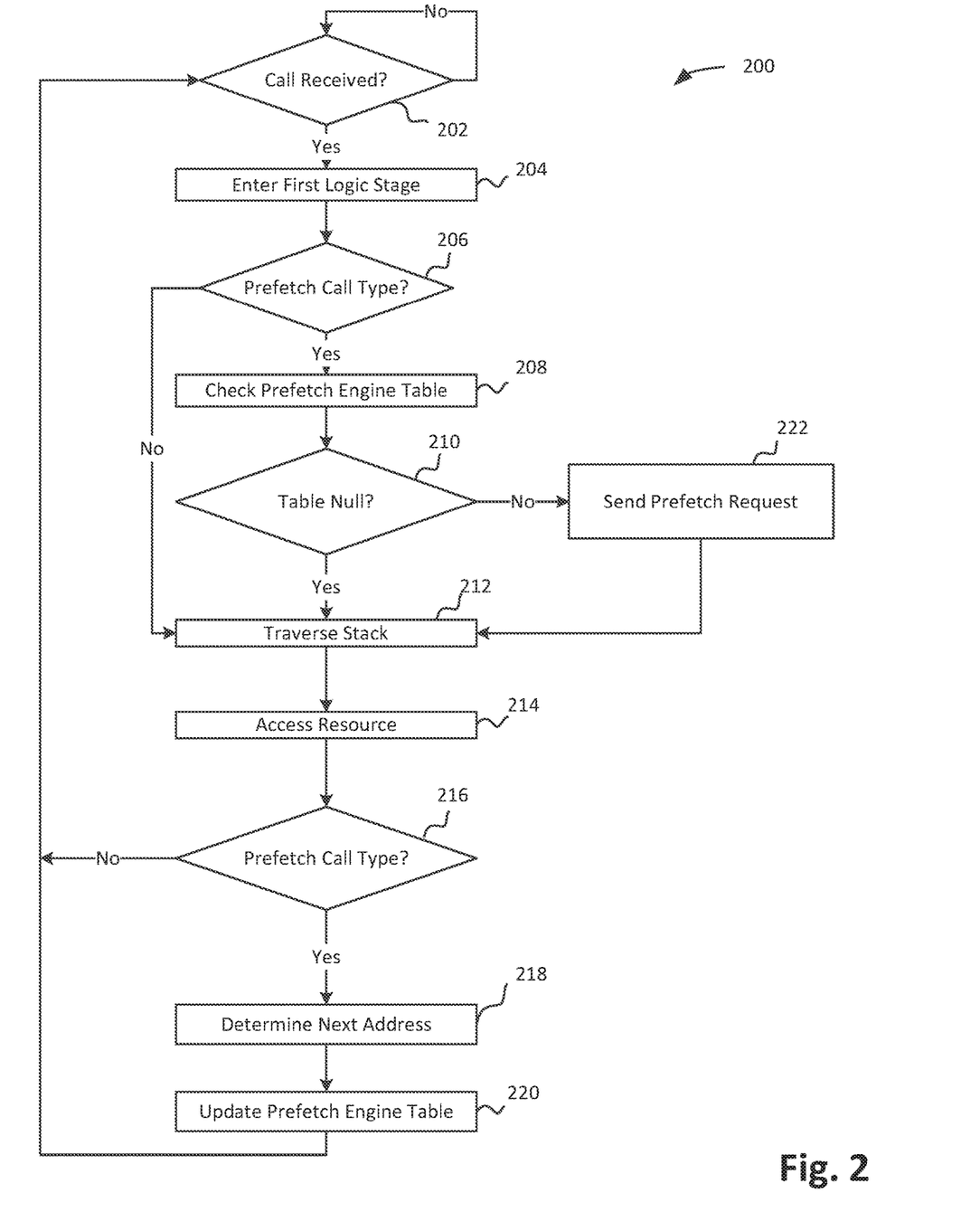
FIG. 2 is a flow diagram of an example process of prefetching resources that may be implemented on various computing devices described herein, in accordance with various embodiments.

FIG. 2 depicts an example process 200 for prefetching resources that may be implemented by the computing device 102 in accordance with various embodiments. In various embodiments, the process 200 may be performed by the library module 120, including the prefetch engine 122 and the prefetch table 144. In other embodiments, the process 200 may be performed with more or less modules and/or with some operations in different order. As shown, for embodiments, the process 200 may start at a decision block 202 where it may be determined whether a call to a library such as the library 120 has been received. If a call has not been received at the library, the process may wait at the decision block 202 in various embodiments.

If, at the decision block 202, a call is received at the library, the process 200 may proceed to a block 204 where a first logic stage, such as the first logic stage 134 may be entered. This may occur by the processor 110 operating the library module 120, and receiving a call, such as an MPI_Send call from an MPI application, to the library. An MPI context may then be entered, and a rank parameter and a communicator parameter from the MPI application may be used to map the MPI_Send call to an internal connection/rank related structure that may be referred to as a virtual connection in various embodiments. Other parameters, such as an MPI tag parameter, may also be used.

At a decision block 206, it may be determined whether the received call is a call type that results in a prefetch request. In embodiments, it may be determined at the decision block 206, whether the received call is within a communication call type category that may include a plurality of call types. For example, the communication call type category may include calls such as MPI_Send, MPI_Sendrecv, and MPI_Put, in various embodiments. In embodiments, it may be determined whether the received call is a specific call type, such as an MPI_Send call, for example, or whether the received call belongs to a set of specific call types.

If, at the decision block 206, it is determined that the received call is a prefetch call type, the process 200 may proceed to a block 208 where a prefetch engine table, such as the prefetch engine table 144 may be checked. The prefetch engine table may be checked from an entry level of the library, such as the first logic stage 134, in embodiments. The prefetch engine table may be checked from a level of the library lower than the entry level, such as the third logic stage 138, that may still be above a transport level of the library used to access resources, in various embodiments. Generally, cross-level prefetch may be performed in various embodiments, with the prefetch engine table being checked at a level of the library higher than a low level transport layer of the library that is used to access resources.

At a decision block 210, it may be determined whether the checked prefetch table is null. If, at the decision block 210, it is determined that the prefetch table is null (such as may occur on an initial iteration of the process 200), a software stack, such as the software stack 132, for example, may be traversed at the block 212. If, at the decision block 206, it is determined that the received call is not a prefetch call type, the process 200 may also proceed to the block 212 where the software stack may be traversed without performing a check of the prefetch engine table.

At operation 214, a resource, such as the first resource 126 (during an initial iteration of the process 200) the second resource 128, or the third resource 130 (during subsequent iterations), may be accessed. If the resource has not been prefetched in a previous iteration of the process 200 or otherwise stored in a cache location, the resource may be accessed in a memory such as the memory 116, for example. If the resource was prefetched in a previous iteration of the process 200, the resource may be accessed in a cache, such as the cache 112 or the external cache 114, in various embodiments. In embodiments, the resource may be accessed by a low level transport logic stage of a software stack in the library, such as the second logic stage 136 in the software stack 132 of the library module 120, for example. When the resource is an intra-node resource such as may be stored in a shared memory location, a low level logic stage such as CH3 or Nemesis may be used to access the resource. When the resource is an inter-node resource, such as may be stored on node 104 or node 106 and accessed from computing device 102, a technology such as InfiniBand may be used to access the resource, with a communications layer such as Nemesis acting as a low level communications logic stage in the software stack that may act through an interface such as DAPL or OFA which may be a part of or external to the software stack in various embodiments.

At a decision block 216, it may be determined whether the received call is a prefetch call type in a similar manner as that discussed with respect to the decision block 206. If the received call is a prefetch call type, such as an MPI_Send call, for example, a next resource address may be determined at a block 218. For example, if a first resource, such as the first resource 126 is accessed at operation 214, the next resource address may correspond to the second resource 128. In embodiments, a transport level of the library, such as the second logic stage 136, may have registered shared memory in a first in first out (FIFO) manner, and the next resource address may be determined based at least in part on this information.

In subsequent iterations of the process 200, the accessed resource and the next resource address may change, with the next resource from the previous iteration becoming the accessed resource in the current iteration. For example, the second resource 128 may become the accessed resource and the third resource 130 may be the next resource on the second iteration of the process 200. At a block 220, the prefetch engine table, such as the prefetch table 144, may be updated based at least in part on the determined next resource address. In embodiments, the prefetch table may be updated with a pointer to the determined next resource address. In embodiments, the prefetch table may be updated with another parameter corresponding to the determined next resource address, such as a virtual memory address identifier or a physical memory address, for example. The prefetch table may be updated with a prefetch depth and a prefetch type in various embodiments, such as described with respect to the prefetch table 144, for example. In embodiments, the prefetch engine table may be updated at the lowest transport level or logic stage in the software stack of the library called by the application.

If, at the decision block 210, it is determined that the prefetch engine table is not null, the process 200 may proceed to a block 222 where a prefetch request may be sent. This may occur by the prefetch engine 122 sending a prefetch request based at least in part on an entry in the prefetch engine table that was updated in a previous iteration of the process 200, for example. The computing device 102 may prefetch the next resource, such as the second resource 128, for example into a cache such as integrated cache 112 or external cache 114, in various embodiments. The prefetch request may be sent from an entry level of an MPI library in various embodiments. The prefetch request may be sent as a suggestion or hint in various embodiments that may be followed depending on other constraints affecting the application, processor, or cache occupancy levels. In embodiments, the prefetch request may be sent as a command that will be followed rather than a suggestion or hint that may be followed. In embodiments, an_mm_prefetch compiler intrinsic may be used to generate a central processing unit (CPU) prefetch instruction. Generally, the prefetch request may be sent in a cross-level manner such that it is sent from a logic stage of the library that is higher than a logic stage used to access the prefetched resource. The process 200 may then proceed to traverse the software stack at the block 212. For example, the process may traverse ADI3 and CH3 levels of the MPI library. The process 200 may then continue at operation 214 as discussed above.

Figure 3:
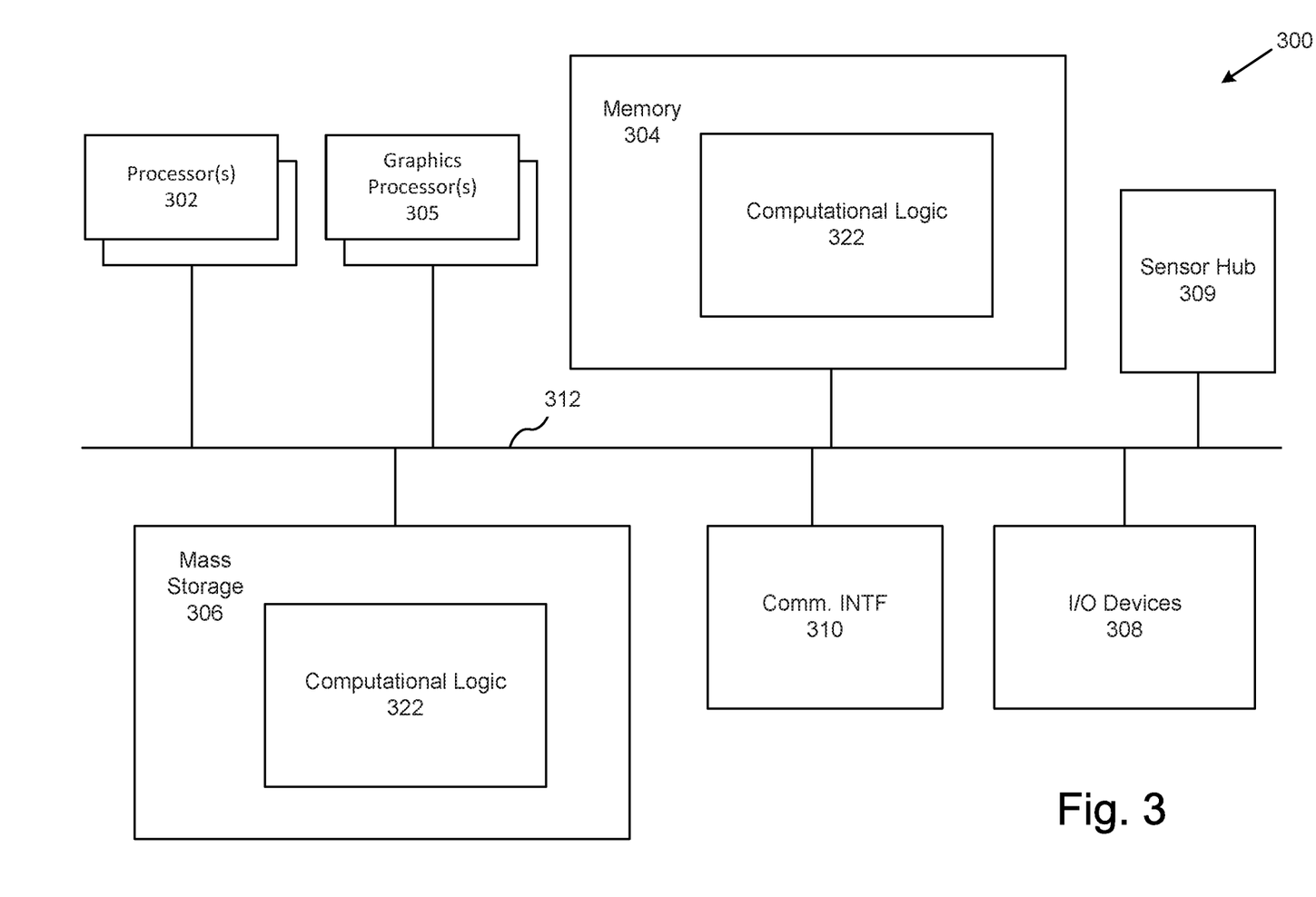
FIG. 3 illustrates an example computing environment suitable for practicing various aspects of the disclosure, in accordance with various embodiments.

Referring now to FIG. 3, an example computer 300 suitable to practice the present disclosure as earlier described with reference to FIGS. 1-2 is illustrated in accordance with various embodiments. As shown, computer 300 may include one or more processors or processor cores 302, and system memory 304. For the purpose of this application, including the claims, the terms "processor" and "processor cores" may be considered synonymous, unless the context clearly requires otherwise. Additionally, computer 300 may include one or more graphics processors 305, mass storage devices 306 (such as diskette, hard drive, compact disc read only memory (CD-ROM) and so forth), input/output devices 308 (such as display, keyboard, cursor control, remote control, gaming controller, image capture device, and so forth), sensor hub 309, and communication interfaces 310 (such as network interface cards, modems, infrared receivers, radio receivers (e.g., Bluetooth), and so forth). The elements may be coupled to each other via system bus 312, which may represent one or more buses. In the case of multiple buses, they may be bridged by one or more bus bridges (not shown).

Each of these elements may perform its conventional functions known in the art. In particular, system memory 304 and mass storage devices 306 may be employed to store a working copy and a permanent copy of the programming instructions implementing the operations associated with the computing device 102, e.g., operations described for library modules 120 and other modules 146, shown in FIG. 1, or operations shown in process 200 of FIG. 2, collectively denoted as computational logic 322. The system memory 304 and mass storage devices 306 may also be employed to store a working copy and a permanent copy of the programming instructions implementing the operations associated with an OS running on the computing device 102. The system memory 304 and mass storage devices 306 may also be employed to store the data or local resources in various embodiments. The various elements may be implemented by assembler instructions supported by processor(s) 302 or high-level languages, such as, for example, C, that can be compiled into such instructions.

The permanent copy of the programming instructions may be placed into mass storage devices 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices.

The number, capability and/or capacity of these elements 308-312 may vary, depending on whether computer 300 is a stationary computing device, such as a server, high performance computing node, set-top box or desktop computer, a mobile computing device such as a tablet computing device, laptop computer or smartphone, or an embedded computing device. Their constitutions are otherwise known, and accordingly will not be further described. In various embodiments, different elements or a subset of the elements shown in FIG. 3 may be used. For example, some devices may not include the graphics processor 305, may use a unified memory that serves as both memory and storage, or may couple sensors without using a sensor hub.

Figure 4:
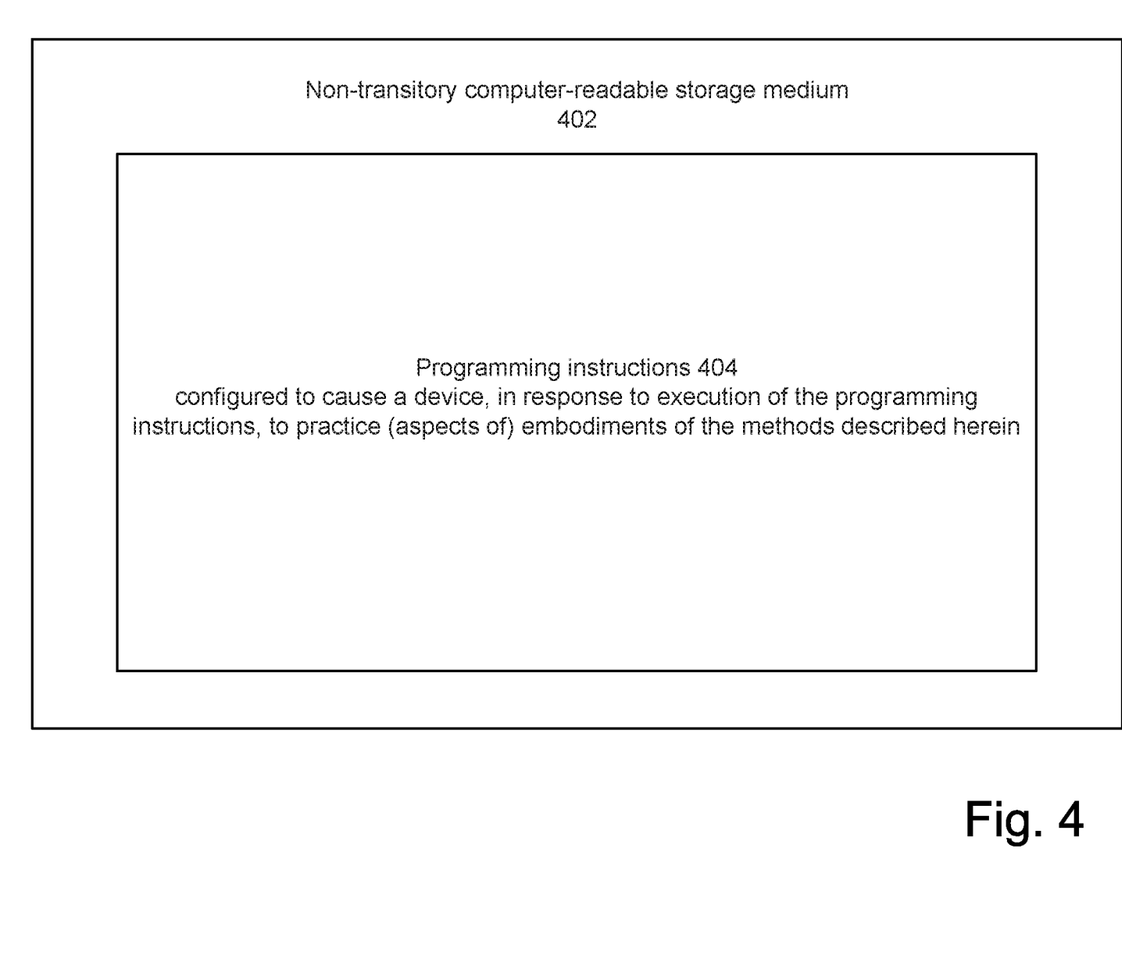
FIG. 4 illustrates an example storage medium with instructions configured to enable an apparatus to practice various aspects of the present disclosure, in accordance with various embodiments.

FIG. 4 illustrates an example of at least one non-transitory computer-readable storage medium 402 having instructions configured to practice all or selected ones of the operations associated with the computing device 102, earlier described, in accordance with various embodiments. As illustrated, at least one non-transitory computer-readable storage medium 402 may include a number of programming instructions 404. The storage medium 402 may represent a broad range of persistent storage medium known in the art, including but not limited to flash memory, dynamic random access memory, static random access memory, an optical disk, a magnetic disk, etc. Programming instructions 404 may be configured to enable a device, e.g., computer 300 or computing device 102, in response to execution of the programming instructions 404, to perform, e.g., but not limited to, various operations described for library module 120 and other modules 146, shown in FIG. 1, or operations of process 200 of FIG. 2. In alternate embodiments, programming instructions 404 may be disposed on multiple computer-readable storage media 402. In alternate embodiment, storage medium 402 may be transitory, e.g., signals encoded with programming instructions 404.

Referring back to FIG. 3, for an embodiment, at least one of processors 302 may be packaged together with memory having computational logic 322 configured to practice aspects described for library modules 120 and other modules 146, shown in FIG. 1, or operations of process 200 of FIG. 2. For an embodiment, at least one of processors 302 may be packaged together with memory having computational logic 322 configured to practice aspects described for library module 120 and other modules 146 shown in FIG. 1, or operations of process 200 of FIG. 1 to form a System in Package (SiP). For an embodiment, at least one of processors 302 may be integrated on the same die with memory having computational logic 322 configured to practice aspects described for library module 120 and other modules 146, shown in FIG. 1, or operations of process 200 of FIG. 2. For an embodiment, at least one of processors 302 may be packaged together with memory having computational logic 322 configured to practice aspects of library module 120 and other modules 146 shown in FIG. 1, or process 200 of FIG. 2 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a computing device for executing applications, comprising: one or more processors; a library module, including a prefetch engine to prefetch resources, operated by the one or more processors to: receive a first call to the library module from an application; access a first resource based at least in part on the first call; and store a first prefetch entry in the prefetch engine based at least in part on an address of a second resource, in preparation to service a second call to the library module from the application that requires traversal of a plurality of stages at the library module.

Example 2 may include the subject matter of Example 1, wherein the computing device further comprises a cache integrated with a processor of the one or more processors, wherein the library module is further operated by the one or more processors to: receive the second call from the application; enter a first logic stage of the library module based at least in part on the second call; perform a first prefetch request based at least in part on the first prefetch entry; enter a second logic stage of the library module lower than the first logic stage; and access, from the second logic stage, the second resource in the cache based at least in part on a result of the first prefetch request.

Example 3 may include the subject matter of any one of Examples 1-2, wherein the library module is a Message Passing Interface (MPI) library module.

Example 4 may include the subject matter of any one of Examples 1-3, wherein the first call is a communication call type, and wherein the second call is a communication call type.

Example 5 may include the subject matter of any one of Examples 1-4, wherein the first call is a first MPI_Send call, and wherein the second call is a second MPI_Send call.

Example 6 may include the subject matter of any one of Examples 2-5, wherein the first prefetch entry includes a pointer to the address of the second resource, a distance value, and a prefetch type, and wherein performing the first prefetch request is based at least in part on the pointer to the address of the second resource, the distance value, and the prefetch type.

Example 7 may include the subject matter of Example 6, wherein the library module is further operated by the one or more processors to: determine an address of a third resource; and store a second prefetch entry in the prefetch engine based at least in part on the address of the third resource, the distance value, and the prefetch type, in preparation to service a third call to the library module from the application that requires traversal of the plurality of stages at the library module.

Example 8 may include the subject matter of of Example 7, further comprising a shared memory, wherein the library module is further operated by the one or more processors to: receive the third call from the application; enter the first logic stage based at least in part on the third call; call the prefetch engine based at least in part on the third call; perform a second prefetch request based at least in part on the second prefetch entry; traverse a third logic stage between the first logic stage and the second logic stage; enter the second logic stage after the third logic stage; and access, from the second logic stage, the third resource in the cache based at least in part on the second prefetch request, wherein the address of the third resource corresponds to a region of the shared memory.

Example 9 may include a computer implemented method for executing applications comprising: receiving, by a computing device, a first call from an application at a shared library; accessing, by the computing device, a first resource based at least in part on the first call; and storing, by the computing device, a first prefetch entry in a prefetch engine based at least in part on an address of a second resource, in preparation to service a second call to the shared library that requires traversal of a plurality of stages at the shared library.

Example 10 may include the subject matter of Example 9, further comprising: receiving, by the computing device, the second call from the application at the shared library; entering, by the computing device, a first logic stage of the shared library based at least in part on the second call; performing, by the computing device, a first prefetch request based at least in part on the first prefetch entry; entering, by the computing device, a second logic stage of the shared library; and accessing, by the computing device from the second logic stage, the second resource in a cache integrated with a processor of the computing device based at least in part on a result of the first prefetch request.

Example 11 may include the subject matter of any one of Examples 9-10, wherein the shared library is a Message Passing Interface (MPI) shared library.

Example 12 may include the subject matter of any one of Examples 9-11, wherein the first call is a communication call type, and wherein the second call is a communication call type.

Example 13 may include the subject matter of any one of Examples 9-12, wherein the first call is an MPI_Send call, and wherein the second call is an MPI_Send call.

Example 14 may include the subject matter of any one of Examples 10-13, wherein the first prefetch entry includes a pointer to the address of the second resource, a prefetch type, and a distance value, and wherein performing the first prefetch request is based at least in part on the pointer to the address of the second resource, the prefetch type, and the distance value.

Example 15 may include the subject matter of Example 14, further comprising: determining, by the computing device, an address of a third resource; and storing, by the computing device, a second prefetch entry in the prefetch engine based at least in part on the address of the third resource, the distance value, and the prefetch type, in preparation to service a third call to the shared library from the application that requires traversal of the plurality of stages at the shared library.

Example 16 may include the subject matter of Example 15, further comprising: receiving, by the computing device, the third call from the application at the shared library; entering, by the computing device, the first logic stage based at least in part on the third call; calling, by the computing device, the prefetch engine based at least in part on the third call; performing, by the computing device, a second prefetch request based at least in part on the second prefetch entry; traversing, by the computing device, a third logic stage between the first logic stage and the second logic stage; entering, by the computing device, the second logic stage after the third logic stage; and accessing, by the computing device from the second logic stage, the third resource in the cache based at least in part on the second prefetch request, wherein the address of the third resource corresponds to a region of shared memory.

Example 17 may include at least one non-transitory computer-readable medium comprising instructions stored thereon that, in response to execution of the instructions by a computing device, cause the computing device to: receive a first call from an application at a shared library; access a first resource based at least in part on the first call; and store a first prefetch entry in a prefetch engine based at least in part on an address of a second resource, in preparation to service a second call to the shared library that requires traversal of a plurality of stages at the shared library.

Example 18 may include the subject matter of Example 17, wherein the computing device is further caused to: receive the second call from the application at the shared library; enter a first logic stage of the shared library based at least in part on the second call; perform a first prefetch request based at least in part on the first prefetch entry; enter a second logic stage of the shared library; and access, from the second logic stage, the second resource in a cache integrated with a processor of the computing device based at least in part on a result of the first prefetch request.

Example 19 may include the subject matter of any one of Examples 17-18, wherein the shared library is a Message Passing Interface (MPI) shared library.

Example 20 may include the subject matter of any one of Examples 17-19, wherein the first call is a communication call type, and wherein the second call is a communication call type.

Example 21 may include the subject matter of any one of Examples 17-20, wherein the first call is an MPI_Send call, and wherein the second call is an MPI_Send call.

Example 22 may include the subject matter of any one of Examples 18-21, wherein the first prefetch entry includes a pointer to the address of the second resource, a prefetch type, and a distance value, and wherein the computing device is caused to perform the first prefetch request is based at least in part on the pointer to the address of the second resource, the prefetch type, and the distance value.

Example 23 may include the subject matter of Example 22, wherein the computing device is further caused to: determine an address of a third resource; and store a second prefetch entry in the prefetch engine based at least in part on the address of the third resource, the distance value, and the prefetch type, in preparation to service a third call to the shared library from the application that requires traversal of the plurality of stages at the shared library.

Example 24 may include the subject matter of Example 23, wherein the computing device is further caused to: receive the third call from the application at the shared library; enter the first logic stage based at least in part on the third call; call the prefetch engine based at least in part on the third call; perform a second prefetch request based at least in part on the second prefetch entry; traverse a third logic stage between the first logic stage and the second logic stage; enter the second logic stage after the third logic stage; and access, from the second logic stage, the third resource in the cache based at least in part on the second prefetch request, wherein the address of the third resource corresponds to a region of shared memory.

Example 25 may include a computing device for executing applications comprising: means for receiving a first call from an application at a shared library; means for accessing a first resource based at least in part on the first call; and means for storing a first prefetch entry in a prefetch engine based at least in part on an address of a second resource, in preparation to service a second call to the shared library that requires traversal of a plurality of stages at the shared library.

Example 26 may include the subject matter of Example 25, further comprising: means for receiving the second call from the application at the shared library; means for entering a first logic stage of the shared library based at least in part on the second call; means for performing a first prefetch request based at least in part on the first prefetch entry; means for entering a second logic stage of the shared library; and means for accessing, from the second logic stage, the second resource in a cache integrated with a processor of the computing device based at least in part on a result of the first prefetch request.

Example 27 may include the subject matter of any one of Examples 25-26, wherein the shared library is a Message Passing Interface (MPI) shared library.

Example 28 may include the subject matter of any one of Examples 25-27, wherein the first call is a communication call type, and wherein the second call is a communication call type.

Example 29 may include the subject matter of any one of Examples 25-28, wherein the first call is an MPI_Send call, and wherein the second call is an MPI_Send call.

Example 30 may include the subject matter of any one of Examples 26-29, wherein the first prefetch entry includes a pointer to the address of the second resource, a prefetch type, and a distance value, and wherein performing the first prefetch request is based at least in part on the pointer to the address of the second resource, the prefetch type, and the distance value.

Example 31 may include the subject matter of Example 30, further comprising: means for determining an address of a third resource; and means for storing a second prefetch entry in the prefetch engine based at least in part on the address of the third resource, the distance value, and the prefetch type, in preparation to service a third call to the shared library from the application that requires traversal of the plurality of stages at the shared library.

Example 32 may include the subject matter of Example 31, further comprising: means for receiving a third call from the application at the shared library; means for entering the first logic stage based at least in part on the third call; means for calling the prefetch engine based at least in part on the third call; means for performing a second prefetch request based at least in part on the second prefetch entry; means for traversing a third logic stage between the first logic stage and the second logic stage; means for entering the second logic stage after the third logic stage; and means for accessing, from the second logic stage, the third resource in the cache based at least in part on the second prefetch request, wherein the address of the third resource corresponds to a region of shared memory.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computing device for executing applications, comprising:
    one or more processors;
    a library module including a plurality of logic stages and a prefetch engine, the prefetch engine having a plurality of instructions arranged to prefetch resources for the plurality of logic stages prior to the resources being accessed by the plurality of logic stages, when the plurality of instructions of the prefetch engine are executed, and each of the plurality of logic stages includes a plurality of instructions, wherein the prefetch engine further includes a prefetch table to hold one or more prefetch entries identifying resources to be prefetched, and the plurality of logic stages are arranged to be selectively executed in succession by the one or more processors, when the library module is called, to:

receive a first call to the library module from an application;
traverse at least a first of the plurality of logic stages to execute at least the instructions of the first logic stage, based at least in part on the first call;
determine, while traversing the first logic stage or a second logic stage subsequent to the first logic stage, whether the first call is a prefetch call type, and if the first call is a prefetch call type, whether there is a prefetch entry in the prefetch table of the prefetch engine to prefetch a first resource;
prefetch the first resource when the first call is a prefetch call type, and the prefetch entry to prefetch a first resource is in the prefetch engine;
access, while traversing the second logic stage or a third logic stage subsequent to the second logic stage, the first resource based at least in part on the first call; and
on access of the first resource, when the first call is a prefetch call type, update the prefetch entry in the prefetch engine with an address of a second resource, in preparation to service a second call to the library module from the application, subsequent to the first call, in the event access of the second resource is triggered, as the plurality of logic stages of the library module are selectively executed again.

2. The computing device of claim 1, wherein the computing device further comprises a cache integrated with a processor of the one or more processors, wherein the library module is further executed by the one or more processors to:
receive the second call from the application;
traverse the first logic stage to execute the plurality of instructions of the first logic stage, based at least in part on the second call;
prefetch, while traversing the first logic stage, the second resource into the cache, based at least in part on the updated prefetch entry;
traverse the second logic stage to execute the plurality of instructions of the second logic stage; and
access, while traversing the second logic stage, the second resource prefetched into the cache.

3. The computing device of claim 2, wherein the library module is a Message Passing Interface (MPI) library module.

4. The computing device of claim 2, wherein the updated prefetch entry includes a pointer to the address of the second resource, a distance value, and a prefetch type, and wherein prefetch the second resource is based at least in part on the pointer to the address of the second resource, the distance value, and the prefetch type.

5. The computing device of claim 4, wherein the library module is further executed by the one or more processors to:
determine an address of a third resource, on access of the second resource; and
update the prefetch entry in the prefetch engine based at least in part on the address of the third resource, in preparation to service a third call to the library module from the application, subsequent to the second call, in the event access of the third resource is triggered as the plurality of logic stages at the library module are selectively executed again.

6. The computing device of claim 5, further comprising a shared memory, wherein the library module is further executed by the one or more processors to:
receive the third call from the application;
traverse the first logic stage to execute the plurality of instructions of the first logic stage, based at least in part on the third call;
prefetch, while traversing the first logic stage, the third resource into the cache, based at least in part on the further updated prefetch entry;
traverse the third logic stage to execute the plurality of instructions of the third logic stage; and
access, while traversing the third logic stage, the third resource prefetched into the cache.

7. The computing device of claim 1, wherein the first call is a communication call type, and wherein the second call is a communication call type.

8. The computing device of claim 7, wherein the first call is a first MPI_Send call, and wherein the second call is a second MPI_Send call.

9. A computer implemented method for executing applications comprising:
receiving, by a shared library of a computing device, a first call from an application, the shared library having a prefetch engine, and a plurality of logic stages arranged to be selectively executed in succession, when the shared library is called, the prefetch engine having a plurality of instructions arranged to prefetch resources for the plurality of logic stages prior to the resources being accessed by the plurality of logic stages, when the plurality of instructions of the prefetch engine are executed, and each of the plurality of logic stages includes a plurality of instructions, wherein the prefetch engine further includes a prefetch table to hold one or more prefetch entries identifying resources to be prefetched;
traversing, by the shared library, at least a first of the plurality of logic stages to execute at least the instructions of the first logic stage, based at least in part on the first call;
determining, by the shared library, while traversing the first logic stage or a second logic stage subsequent to the first logic stage, whether the first call is a prefetch call type, and if the first call is a prefetch call type, whether there is a prefetch entry in the prefetch table of the prefetch engine to prefetch a first resource;
prefetching, by the shared library, the first resource when the first call is a prefetch call type, and the prefetch entry to prefetch the first resource is in the prefetch engine;
accessing, by the shared library, while traversing the second logic stage or a third logic stage subsequent to the second logic stage, the first resource based at least in part on the first call; and
on access of the first resource, when the first call is a prefetch call type, updating, by the shared library, the prefetch entry in the prefetch engine of the shared library based at least in part on an address of a second resource, in preparation to service a second call from the application, subsequent to the first call, in the event access of the second resource is triggered, as the plurality of logic stages of the shared library are selectively executed again.

10. The method of claim 9, further comprising:
receiving, by the shared library, the second call from the application;
traversing, by the shared library, the first logic stage to execute the plurality of instructions of the first logic stage, based at least in part on the second call;
prefetching, by the shared library, while traversing the first logic stage, the second resource, into a cache of the computing device, based at least in part on the updated prefetch entry;

traversing, by the shared library, the second logic stage to execute the plurality of instructions of the second logic stage; and accessing, by the shared library from the second logic stage, the second resource in the cache.

11. The method of claim 10, wherein the shared library is a Message Passing Interface (MPI) shared library.

12. The method of claim 10, wherein the updated prefetch entry includes a pointer to the address of the second resource, a prefetch type, and a distance value, and wherein prefetching the second resource is based at least in part on the pointer to the address of the second resource, the prefetch type, and the distance value.

13. The method of claim 12, further comprising:
determining, by the shared library, an address of a third resource, on access of the second resource; and
updating, by the shared library, the prefetch entry in the prefetch engine based at least in part on the address of the third resource, in preparation to service a third call to the shared library from the application, subsequent to the second call, in the event access of the third resource is triggered, as the plurality of logic stages of the shared library are selectively executed again.

14. The method of claim 13, further comprising:
receiving, by the shared library, the third call from the application;
traversing, by the shared library, the first logic stage to execute the plurality of instructions of the first logic stage, based at least in part on the third call;
prefetching, by the shared library, while traversing the first logic stage, the third resource into the cache, based at least in part on the further updated prefetch entry;
traversing, by the shared library, the third logic stage to execute the plurality of instructions of the third logic stage; and
accessing, by the shared library while traversing the third logic stage, the third resource in the cache.

15. The method of claim 9, wherein the first call is a communication call type, and wherein the second call is a communication call type.

16. The method of claim 15, wherein the first call is an MPI_Send call, and wherein the second call is an MPI_Send call.

17. At least one non-transitory computer-readable medium comprising instructions stored thereon that, in response to execution of the instructions by a computing device, cause the computing device to operate a shared library having a plurality of logic stages to be selectively executed, and a prefetch engine, to:
receive a first call from an application, at the shared library, calling the shared library, the prefetch engine having a plurality of instructions arranged to prefetch resources for the plurality of logic stages prior to the resources being accessed by the plurality of logic stages, when the plurality of instructions of the prefetch engine are executed, and each of the plurality of logic stages includes a plurality of instructions, wherein the prefetch engine further includes a prefetch table to hold one or more prefetch entries identifying resources to be prefetched;
traverse a first of the plurality of logic stages to execute the instructions of the first logic stage, based at least in part on the first call;
determine, while traversing the first logic stage or a second logic stage subsequent to the first logic stage, whether the first call is a prefetch call type, and if the first call is a prefetch call type, whether there is a prefetch entry in the prefetch engine to prefetch a first resource;
prefetch the first resource when the first call is a prefetch call type, and there is a prefetch entry in the prefetch table of the prefetch engine to prefetch a first resource;
access, while traversing the second logic stage or a third logic stage subsequent to the second logic stage, the first resource based at least in part on the first call; and
on access of the first resource, when the first call is a prefetch call type, update the prefetch entry in the prefetch engine based at least in part on an address of a second resource, in preparation to service a second call to the shared library, subsequent to the first call, in the event access of the second resource is triggered, as the plurality of stages at the shared library are selectively executed again.

18. The at least one non-transitory computer-readable medium of claim 17, wherein the shared library is to further:
receive the second call from the application;
traverse the first logic stage of the shared library to execute the plurality of instructions of the first logic stage, based at least in part on the second call;
prefetch, while traversing the first logic stage, the second resource into a cache of the computing device, based at least in part on a first prefetch entry;
traverse the second logic stage of the shared library to execute the plurality of instructions of the second logic stage; and
access, while traversing the second logic stage, the second resource in the cache.

19. The at least one non-transitory computer-readable medium of claim 18, wherein the shared library is a Message Passing Interface (MPI) shared library.

20. The at least one non-transitory computer-readable medium of claim 18, wherein the updated prefetch entry includes a pointer to the address of the second resource, a prefetch type, and a distance value, and wherein the computing device is caused to prefetch the second resource based at least in part on the pointer to the address of the second resource, the prefetch type, and the distance value.

21. The at least one non-transitory computer-readable medium of claim 20, wherein the shared library is to further:
determine an address of a third resource, on access of the second resource; and
update a second prefetch entry in the prefetch engine based at least in part on the address of the third resource, the distance value, and the prefetch type, in preparation to service a third call to the shared library from the application, subsequent to the second call, that requires traversal of the plurality of logic stages at the shared library.

22. The at least one non-transitory computer-readable medium of claim 21, wherein the shared library is to further:
receive the third call from the application;
traverse the first logic stage to execute the plurality of instructions of the first logic stage, based at least in part on the third call;
prefetch, while traversing the first logic stage, the third resource into the cache, based at least in part on the further updated prefetch entry;
traverse the third logic stage to execute the plurality of instructions of the third logic stage; and
access, while traversing the third logic stage, the third resource in the cache.

23. The at least one non-transitory computer-readable medium of claim 17, wherein the first call is a communication call type, and wherein the second call is a communication call type.

24. The at least one non-transitory computer-readable medium of claim 23, wherein the first call is an MPI_Send call, and wherein the second call is an MPI_Send call.

* * * * *